United States Patent [19]

Tierney

[11] Patent Number: 5,102,203

[45] Date of Patent: Apr. 7, 1992

[54] VEHICLE TRACTION CONTROL SYSTEM

[75] Inventor: Gordon L. Tierney, Washington, Mich.

[73] Assignee: General Motors Corporation, Detroit, Mich.

[21] Appl. No.: 722,561

[22] Filed: Jun. 27, 1991

[51] Int. Cl.$^5$ ............................................... B60T 8/08
[52] U.S. Cl. .................................. 303/93; 180/197;
192/1.23; 188/181 T; 303/100; 303/104;
303/106; 364/426.03
[58] Field of Search ................... 303/93, 110, 113 TR,
303/113 TB, 100, 110, 104, 102, 103, 96, 112,
115 EM, 105-109; 364/426.03; 180/197;
188/181 T, 181 C; 192/1.23, 1.22, 1.24

[56] References Cited

U.S. PATENT DOCUMENTS

| | | |
|---|---|---|
| 4,664,453 | 5/1987 | Kade et al. .................. 303/104 X |
| 4,946,015 | 8/1990 | Browalski et al. . |
| 4,991,679 | 2/1991 | Fujii et al. .................... 303/112 X |
| 4,998,782 | 3/1991 | Thatcher et al. . |
| 5,015,040 | 5/1991 | Lih ................................ 303/93 |

Primary Examiner—Douglas C. Butler
Attorney, Agent, or Firm—Howard N. Conkey

[57] ABSTRACT

A traction controller which modulates brake pressure to prevent excessive wheel spin in each of the driven wheels of a vehicle senses a side to side spin cycling condition of the driven wheels and increases the brake pressure of the driven wheel having the lesser of the two driven wheel brake pressures to a larger percentage of the other driven wheel brake pressure to inhibit the side to side spin cycling condition. The side to side spin cycling condition is represented by one driven wheel accelerating with a positive jerk value while the other driven wheel is decelerating with a negative jerk value.

7 Claims, 5 Drawing Sheets

VEHICLE TRACTION CONTROL SYSTEM

BACKGROUND OF THE INVENTION

This invention relates to a vehicle traction control system and method and specifically to such a system and method for preventing side-to-side spin cycling.

When the operator initiated torque delivered to the driven wheels of a vehicle during vehicle acceleration are such that the frictional forces between the tire and the road surface are overcome, excessive wheel spin results. While a small amount of spin between the tire and road surface is necessary in order to achieve a driving force, excessive spin results in the reduction of the effective driving force and in the deterioration in the lateral stability of the vehicle.

Various methods have been proposed for preventing an excessive spinning condition of the driven wheels of a vehicle by limiting the spin between the wheel and the road surface at a value that will achieve a maximum transfer of driving force from the driven wheels to the road surface. One such method senses the excessive spin condition at a driven wheel and applies the brakes of that wheel by an amount that limits the slip at a desired value.

Such traction control systems which use the left and right driven wheel brakes to independently reduce the velocity of the left side and right side spinning wheels to limit wheel spin may under certain conditions induce an out of phase or side to side spin cycling action. This condition may result in a deterioration in performance quality and may add stress to the vehicle powertrain components. In general, the condition arises as follows. The brake pressure applied to one of the spinning wheels will result in a reduction of that wheel velocity, but will also increase the level of the torque delivered to that half shaft. The torque on the half shaft is the sum of the torque delivered to the ground and the torque needed to brake the spinning wheel. Since the differential delivers equal torque to both drive wheels (via the half shafts), that increase in torque will also be delivered to the opposite drive wheel. The non spinning drive wheel starts to accelerate while the spinning drive wheel is decelerating. The increased torque to the non-spinning wheel is enough to cause this wheel to now spin. The original spinning wheel, since the spin has been reduced, does not require as much brake pressure as it originally had and now causes a reduction in torque. The second spinning wheel now requires an increase in brake pressure which produces an increase in torque. This situation, if out of phase, could cause the undesirable cyclic side to side spin action.

SUMMARY OF THE INVENTION

In general, this invention relates to an improved traction controller which modulates brake pressure to prevent excessive wheel spin wherein an induced side-to-side oscillation of spin of the driven wheels is prevented.

In accord with the principles of this invention, the controller examines the parameters which indicate an out of phase condition in the behavior of the driven wheels and adjusts the braking pressure employed to prevent excessive wheel spin so as to eliminate the condition.

In one form of the invention, the brake pressure of the driven wheel having the lesser of the two driven wheel brake pressures is increased to a larger percentage of the other driven wheel brake pressure.

In another aspect of the invention, the out of phase condition is represented by one driven wheel accelerating with a positive jerk value while the other driven wheel is decelerating with a negative jerk value.

DESCRIPTION OF THE DRAWINGS

The invention may be best understood by reference to the following description of a preferred embodiment and the drawings in which.

Figure 1:
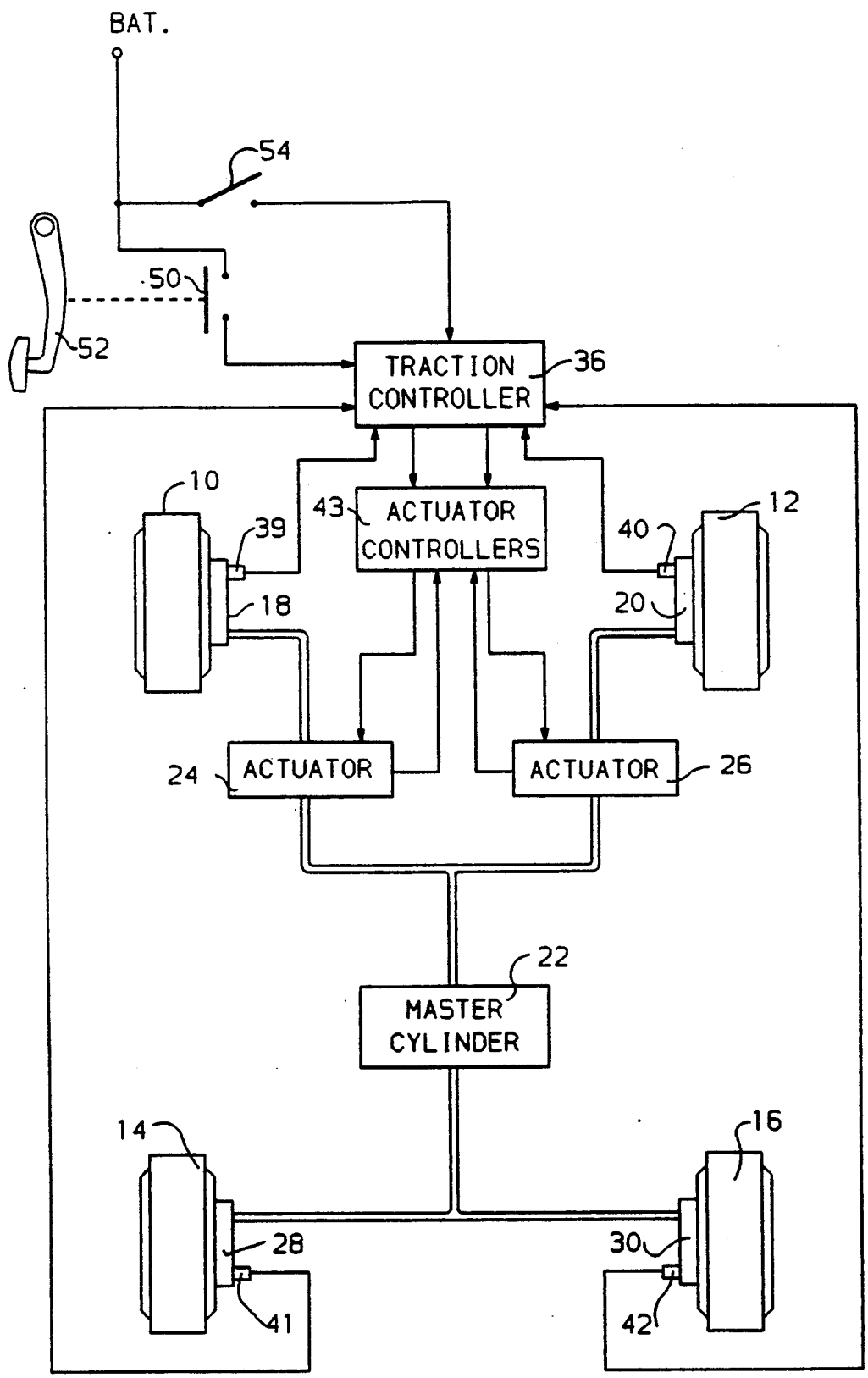
FIG. 1 is a schematic block diagram of a vehicle traction control system.

A traction control system for a front wheel drive vehicle is illustrated in FIG. 1. The vehicle has two front driven wheels 10 and 12 and two rear non-driven wheels 14 and 16. The front wheels 10 and 12 have respective hydraulic actuated brakes 18 and 20 actuated by manual operation of a conventional master cylinder 22 through a pair of traction control pressure actuators 24 and 26. As will be described, when the actuators 24 and 26 are inactive, the hydraulic fluid from the master cylinder 22 passes through the actuators 24 and 26 to the brakes 18 and 20 of the wheels 10 and 12. Thus, the actuators 24 and 26 are transparent to the braking system during normal braking of the wheels 10 and 12. Similarly, the rear wheels 14 and 16 include a pair of hydraulic actuated brakes 28 and 30 operated by hydraulic fluid under pressure from the master cylinder 22 in response to manual actuation of the brakes.

The front wheels 10 and 12 are driven through a differential via a conventional vehicle powertrain, not shown, including an internal combustion engine under control of the vehicle operator. If the engine is operated so as to deliver excessive torque to the driven wheels 10 and 12, they will experience excessive spin relative to the road surface thereby reducing the tractive force and lateral stability of the vehicle. In order to limit the acceleration spin of the driven wheels 10 and 12 resulting from excess engine output torque, a traction controller 36 is provided which limits spin by operating the brakes of the driven wheels 10 and 12.

The traction controller 36 monitors the wheel speeds of the left and right driven wheels 10 and 12 via speed sensors 39 and 40 and the wheel speeds of the left and right undriven wheels 14 and 16 via speed sensors 41 and 42 to determine whether or not an excessive spinning wheel condition exists. If such a condition is detected, the actuators 24 and 26 are operated via actuator controllers 43 for braking the left, right or both of the driven wheels 10 and 12 experiencing an excessive spinning condition.

Additional signal inputs used in controlling acceleration spin include a brake condition signal provided by a brake switch 50 closed upon actuation of the brakes of the vehicle by the conventional brake pedal 52 and a signal provided by a manually operable disable switch 54 closed to disable traction control at the option of the vehicle operator.

Figure 2:
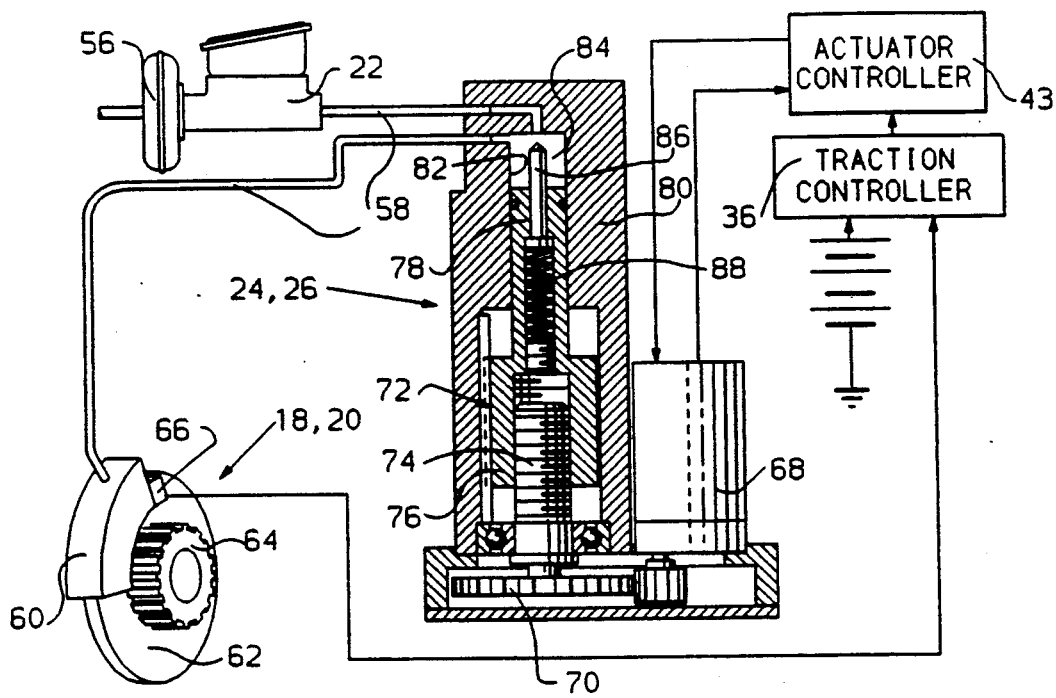
FIG. 2 is a view of the brake pressure modulator for controlling wheel brake pressure for limiting wheel spin.

Referring to FIG. 2, there is illustrated a braking system for one of the driven wheels 10 or 12 including the actuator 24,26 controlled by the traction controller 36 for limiting spin of the driven wheel. In general, the braking system is composed of a hydraulic boost unit 56 and brake lines 58 providing fluid communication with the wheel brake 18,20. The wheel brake is illustrated as a disc brake system that includes a caliper 60 located at a rotor 62 of the vehicle wheel.

A wheel speed sensing assembly at each wheel is generally comprised of an exciter ring 64 which is rotated with the wheel and an electromagnetic sensor 66 which monitors the rotation of the exciter ring to provide a signal having a frequency proportional to wheel speed. The wheel speed signals are provided to the traction controller 36 to be used to determine the wheel speed.

The actuator 24,26 is illustrated in the inactive position wherein it is transparent to the braking system. This is the actuator condition during normal vehicle braking. Each actuator in the preferred embodiment includes a DC torque motor 68 whose output shaft drives a gear train 70 whose output turns a ball screw actuator 72 comprised of a linear ball screw 74 and nut 76. As the linear ball screw rotates, the nut 76 is either extended or retracted thereby positioning a piston 78 which forms a part of the nut 76.

Each actuator includes a housing 80 in which a cylinder 82 is formed. The piston 78 is reciprocally received in the cylinder 82 and defines therewith a chamber 84. The cylinder 82 has an inlet which is connected to the master cylinder 22 and an outlet which is coupled to the brake caliper 60 of the wheel brake.

A valve member 86 is carried by and extends from the end of the piston 78. This member is spring biased within the piston 78 to an extended position as shown by a spring 88. When the piston 78 is in the retracted position illustrated, the fluid path between the master cylinder 22 and the wheel brake 18 is open. When, however, the ball screw 74 is rotated by the motor 68 to extend the nut 76 and therefore the piston 78, the valve member 86 is seated against the opening at the inlet to the chamber 84 from the master cylinder 22 to isolate the chamber 84 and the wheel brake 60 from the master cylinder 22. Once the valve 86 is seated, further extension of the piston 78 by rotation of the motor 68 then functions to pressurize the fluid at the brake 18 to apply braking forces to the wheel.

The power consumed by the DC motor 68 while controlling pressure is directly proportional to the rotational torque exerted by the motor on the gear train 70. The rotational torque is translated through the linear ball screw and nut 74 and 76 to the piston 78. The pressure present at the piston head is proportional to the wheel brake pressure. Therefore, the value of the current through the DC motor 68 is proportional to the wheel brake pressure and can be considered a measure thereof.

The ball screw actuator 72 is a high efficiency actuator so that the ball screw 74, gear train 70 and the motor output shaft are reverse driven by the hydraulic pressure acting on the piston 78 when it is greater than the torque output of the motor 68 until the hydraulic pressure is reduced to a level where it is overcome or offset by the torque output of the DC motor 68.

Figure 3:
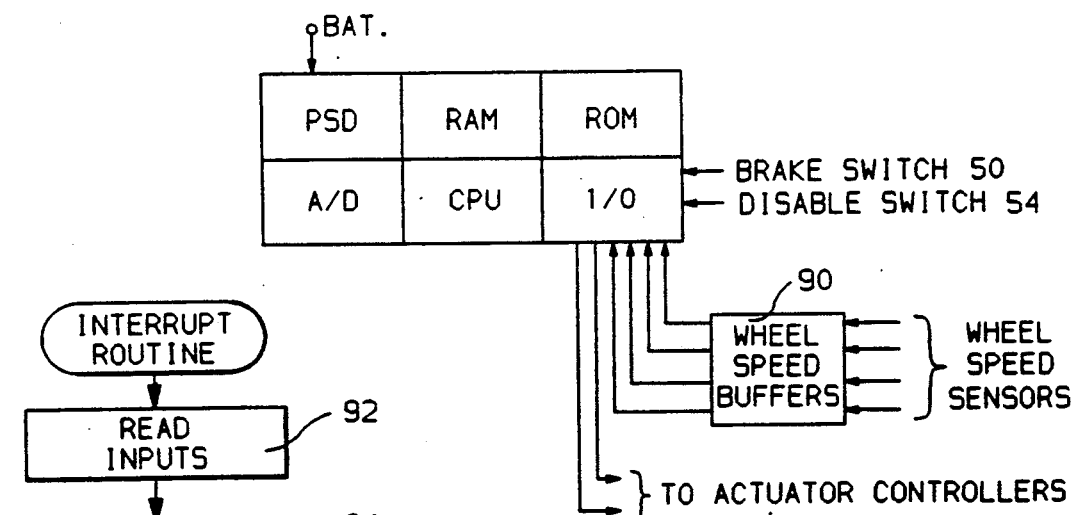
FIG. 3 is a diagram of the traction controller of FIG. 1 for applying brake pressure for control of wheel spin.

The traction controller 36 of FIG. 1 takes the form of a conventional general purpose digital computer programmed to control the spin of the driven wheels 10 and 12 in accord with the principles of this invention. As illustrated in FIG. 3, the traction controller 36 consists of a common digital computer composed of a read-only memory (ROM), a random access memory (RAM), an analog-to-digital converter (A/D), a power supply device (PSD), a central processing unit (CPU) and an input/output section (I/O) which interfaces to a wheel speed buffer circuit 90 which functions to condition the speed signal outputs of the wheel speed sensors, the actuator controllers 43, the brake switch 50, and the disable switch 54.

The actuator controllers 43 take the form of two conventional independent closed loop motor current controllers each of which establishes the current through the motor 68 of a respective one of the actuators 24 or 26 at a level commanded by the traction controller.

The ROM of the digital computer of FIG. 3 contains the instructions necessary to implement the control algorithm as diagrammed in the FIGS. 4-7. The specific programming of the ROM for carrying out the functions depicted in the flow diagrams of FIGS. 4-7 may be accomplished by standard skill in the art using conventional information processing languages.

When power is first applied to the system from the conventional vehicle battery, the computer program is initiated. The program may first provide for initialization of various random access memory variables to calibrated values and other functions. When this initialization routine is completed, a background loop may be executed that contains various system maintenance and diagnostic routines. This loop may be interrupted by one or possibly several system interrupts whereby control will be shifted to the appropriate interrupt service routine. In this embodiment, one such system interrupt is a control cycle interrupt provided at, for example, 10 millisecond intervals whereby the interrupt routine of FIG. 4 is executed.

Figure 4:
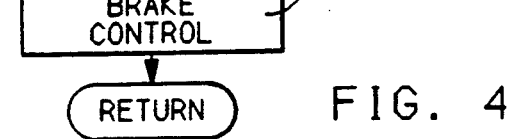
FIGS. 4, 5, 6 and 7 are flow diagrams illustrating the operation of the traction controller of FIG. 1.

Referring to FIG. 4, the control cycle interrupt routine for limiting the acceleration spin of the driven wheels 10 and 12 is illustrated. At the first step 92, the controller reads the various system inputs including the left front, right front, left rear and right rear wheel speeds $V_{lf}$, $V_{rf}$, $V_{lr}$ and $V_{rr}$ and the discrete signal states including the open or closed state of the brake switch 50 and the disable switch 54.

Next, various wheel state variables are determined at step 94. The wheel state variables include filtered values of wheel speed and acceleration. The filtering may be provided by use of a standard first order lag equation. In addition, the absolute magnitude of the difference in speed of the driven and undriven wheels on the same side of the vehicle is determined by the absolute magnitude of the expressions $V_{lf}-V_{lr}$ for the left side wheels 10 and 14 and $V_{rf}-V_{rr}$ for the right side wheels 12 and 16. These difference values represent driven wheel spin based on driven and undriven wheel speeds on the same side of the vehicle wherein the speed of the undriven wheel is a measure of vehicle speed. Also determined at this step is the value of jerk (rate of change in acceleration) for each of the driven wheels. The final wheel state variable determined is a measure of vehicle acceleration as represented, for example, by the average of the acceleration values of the undriven wheels.

Once the wheel state variables have been determined, the next step 96 determines the proper mode of operation of the brake actuators. This step is described in detail in reference to FIG. 5. Then at step 98, the output current commands are determined and provided to the actuator controllers for limiting wheel spin at the desired values and for inhibiting an out of phase condition in the behavior of the driven wheels in accord with this invention. This step is described in detail in reference to FIGS. 6 and 7.

The brake mode determination routine 96 will now be described with reference to FIG. 5. At this point, it should be noted that unless a program function specifically relates to both wheels, the routine is selectively conditioned for performing steps associated with one or the other left or right driven wheel 10 or 12. Accordingly, parameters associated with one of the driven wheels are selected depending upon which wheel the routine is conditioned for. It will be assumed that the routine is first conditioned for the left driven wheel 10 at step 100.

The program next evaluates the status of the brake switch 50 at step 102 and the status of the manually operated disable switch 54 at step 104. The sensed closure of either one of these switches represents a condition not requiring acceleration spin control and the program exits the brake mode routine. However, if neither of the switches 50 and 54 is closed, the program continues to evaluate the wheel variables to determine if brake actuation is required.

An excessive acceleration spin condition is represented for the wheel if the actual wheel spin represented by the difference in the velocity of the wheel and the velocity of the undriven wheel on the same side of the vehicle is greater than a desired spin limit. In this regard, the wheel spin error is determined at step 106 by subtracting the desired spin limit from the actual wheel spin computed at step 94. The desired spin limit may be a calibration constant stored in ROM. In one embodiment, the desired spin limit may be retrieved from a lookup table stored in ROM as a function of vehicle acceleration as represented, for example, by the average of the two undriven wheel acceleration values.

If the next step 108 determines the error is not negative indicating wheel spin is at least equal to the desired spin limit, a release counter is cleared at step 110 after which a traction control active (TCA) flag is checked at step 112 to determine if wheel spin control by brake pressure application to the selected wheel is already active in response to a previously sensed excessive spin condition. If not set then the program determines if traction control should be requested based on whether or not the spin error determined at step 106 is greater than zero indicating an excessive wheel spin condition. This determination is made at step 114. If the spin error is greater than zero, traction control is requested by setting the TCA flag for the selected wheel at step 116.

If step 112 determines the TCA flag is already set or if just set at step 116, the program determines at step 118 if it is presently conditioned for the left wheel and if so, advances to the right wheel by pointing to the right wheel variables at a step 120. Following step 120, the program returns to step 106 and continues while using the right wheel variables and parameters.

Returning to step 108, if the spin error is determined to be negative indicating wheel spin is not excessive and a step 122 senses that the TCA flag for the selected wheel is set, the program checks whether the TCA flag should be cleared to terminate traction control for that wheel. In this embodiment the TCA flag is cleared to effect termination of traction control when the spin error is negative for a specified amount of time represented by N interrupt intervals. This timing function is provided by incrementing the release counter at step 124 and comparing the resulting count with the value N at step 126. If the count is greater than N, the TCA flag is cleared at step 128, otherwise, the step 128 is bypassed. Whenever step 122 senses that the TCA flag is already cleared, the steps 124–128 are bypassed. If step 122 indicates the TCA flag is cleared or if the flag is set at step 128, the program advances to the right wheel via the steps 118 and 120 or to the next routine.

Figure 5:
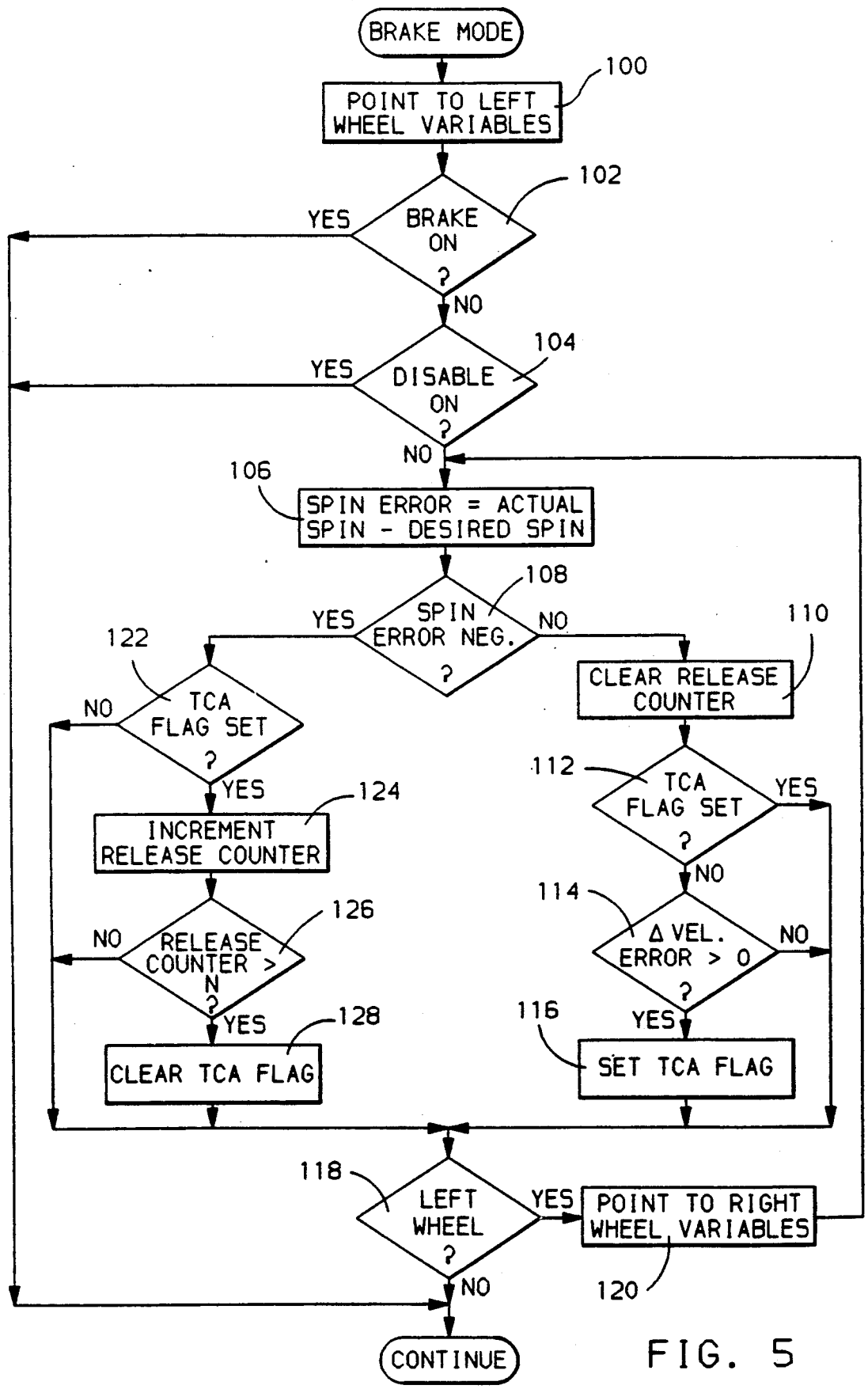
Figure 6:
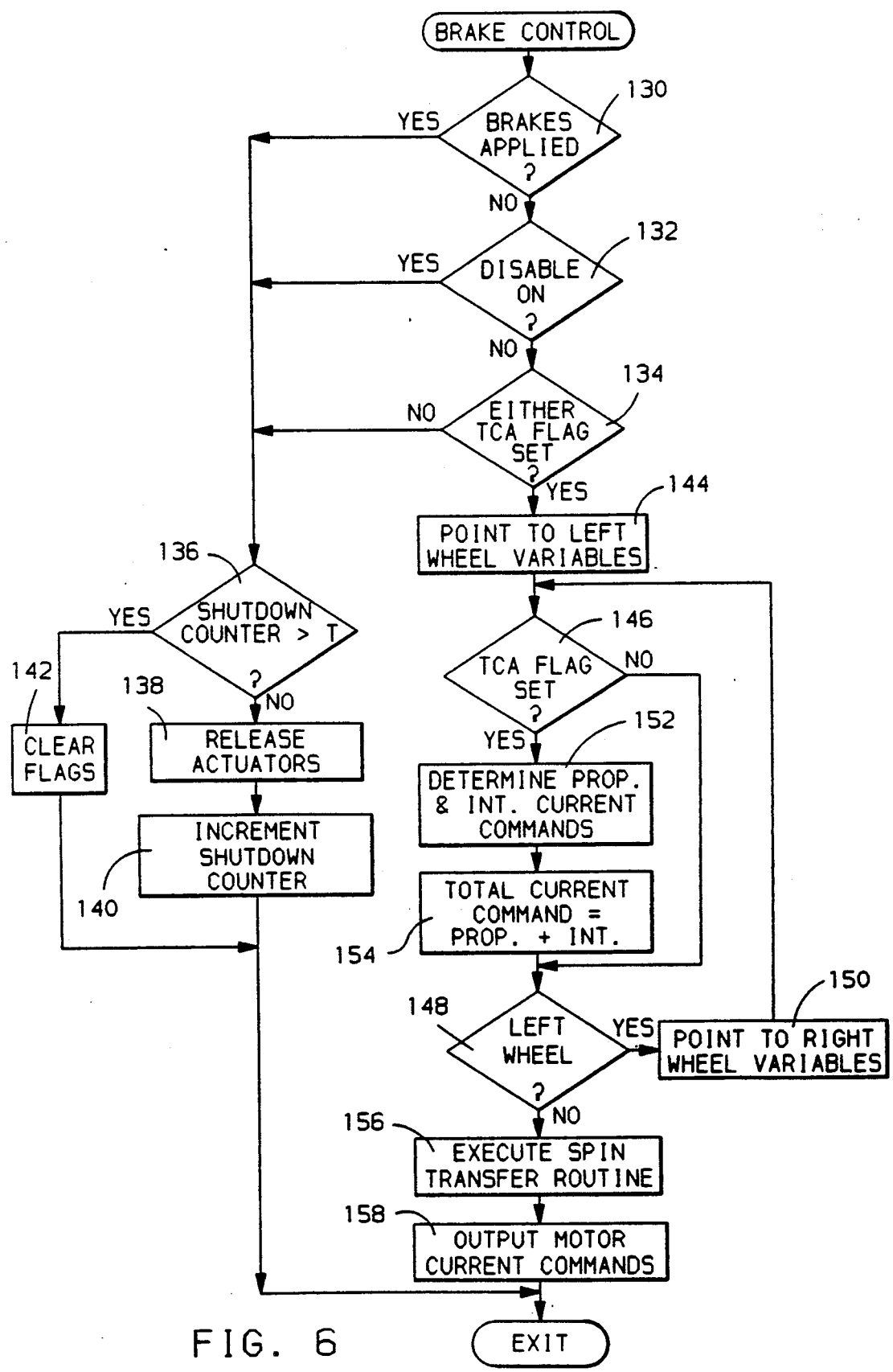
Figure 7:
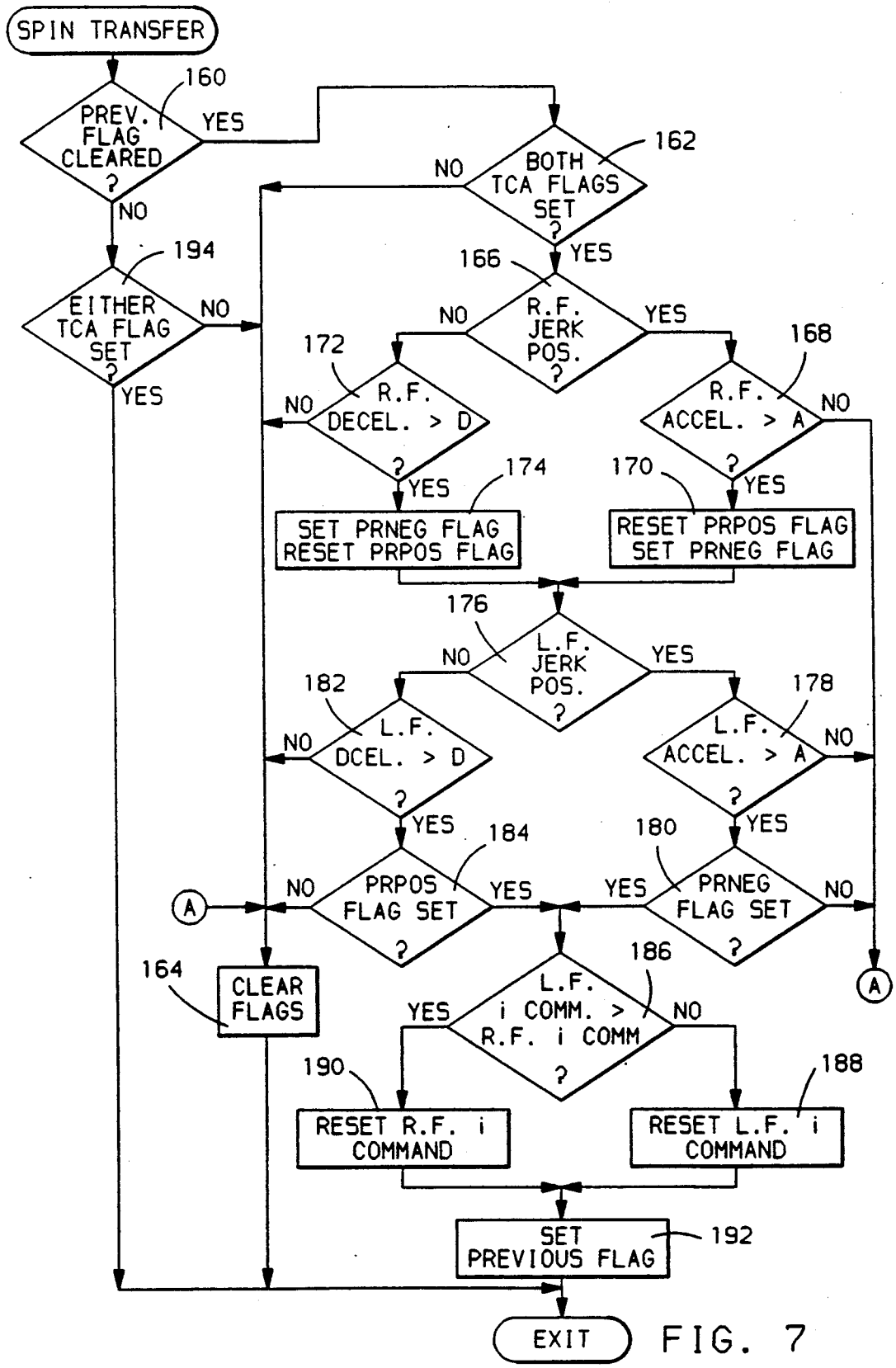

Upon completion of the mode determination routine, the brake control routine 98 of FIG. 5 is executed as illustrated in detail in FIGS. 6 and 7. The brake control routine first checks for brake pedal application at step 130, a disable condition at step 132 or the lack of either wheel's TCA flag being set at step 134. If any of those conditions are satisfied, brake pressure from both actuators will be released. This is done by applying reverse current to both brake actuator motors for a set period of time represented by T interrupt intervals. This is accomplished by checking the value of a shutdown counter at step 136. If not greater than the value T, the actuators 24 and 26 are retracted by commanding reverse current to the actuators at step 138. The shutdown counter is then incremented at step 140. The reverse current on the brake motors returns the pistons 78 in the actuators 24 and 26 to their home positions and opens valves 86, allowing normal braking function. When the actuators have been retracted for the time T, the steps 138 and 140 are bypassed. All flags used in brake control are then cleared at the next step 142.

If step 130 determines that the brake pedal 52 is not actuated, step 132 determines that the disable switch 54 is open and if step 134 determines that either TCA flag is set, the left wheel is selected to at step 144 to condition the routine for the left wheel with its related parameters.

Step 146 then determines if the TCA flag has been set by the brake mode determining routine of FIG. 5 in response to a sensed excessive spin condition for the selected wheel. If not set, indicating an excessive spin condition has not been sensed for the selected wheel, the program determines at step 148 if the routine is conditioned for the left wheel and if so, points to the right wheel variables at step 150 after which the routine returns to step 146.

If step 146 determines that the TCA flag for the selected wheel is set indicating an excessive spin condition was sensed for that wheel in the brake mode routine of FIG. 5, brake control integral and proportional current command terms are then derived at step 152 based upon the spin error determined at step 106 to determine the current command to the motor 68 and therefore brake pressure to the selected wheel brake. The proportional term is the product of a proportional gain factor and the spin error. An integral correction value is computed as the product of an integral gain factor and the spin error. The integral term determined at step 152 is then the sum of the prior integral term and the integral correction value. Once the proportional and integral current commands are computed, step 154 determines the total motor current command by summing together the proportional and integral terms.

From step 154, the program then executes step 148 which determines if the routine is conditioned for the left wheel and if so, points to the right wheel variables at the step 150 after which the routine returns to step 146 and continues thereby controlling the brake pressure to the right wheel based on spin error in the same manner previously described in relation to the left wheel.

When the steps 146-154 have been executed for both the right and left driven wheels, the program then executes the spin transfer routine incorporating the principles of this invention at step 156 and which is illustrated in detail in FIG. 7. Step 158 then provides the left and right motor current commands to appropriate actuator controller for applying the wheel brakes to control acceleration spin. As indicated, the commanded motor current is a measure of brake pressure.

Repeated executions of the routine of FIG. 6 provide for the establishment of a respective commanded motor current to the actuator motor of each wheel experiencing an excessive spin condition that eliminates the spin error by progressively adjusting the integral term of the current command in direction reducing the spin error to zero. Further, the spin transfer routine 156 functions in accord with the principles of this invention to examine the parameters of both the driven wheels to determine if an out of phase condition in the behavior of the driven wheels exists and, if so, adjust the lowest one of the driven wheel braking pressures to a higher fraction of the braking pressure of the other driven wheel to eliminate the condition. In this respect, it is recalled that the motor current is a measure of the brake pressure so that the desired adjustment to the lowest one of the driven wheel braking pressures may be accomplished by making the appropriate adjustment to the lowest one of the driven wheel motor current commands.

The spin transfer routine 156 will now be described with reference to FIG. 7. The routine first checks the status of a PREVIOUS flag at step 160. As will be described, this flag will be set whenever the routine senses an out of phase condition of the driven wheels and has taken corrective action. Assuming first that this action has not been taken such that the PREVIOUS flag is cleared, the state of the TCA flags associated with each of the wheels is sampled at step 162. It will be recalled that the TCA flag for each driven wheel is set at step 116 of FIG. 5 whenever an excessive spin condition for that wheel is detected. If both of the TCA flags are not set indicating that neither or only one of the driven wheels is being braked in response to an excessive spin condition to limit wheel spin, the various flags controlled by the spin transfer routine are cleared at step 164 after which the program exits the spin transfer routine.

If step 162 determines that both driven wheel TCA flags are set, the routine next determines if the out of phase condition representing a side to side spin cycling condition exists. This condition is represented by the jerk of one of the wheels being negative and its deceleration being greater than a ROM stored calibration value D while the jerk of the other wheel is positive and its acceleration is greater than a ROM stored calibration value A.

The sensing of the out of phase condition begins at step 166 which senses the sign of the jerk of the right front driven wheel 12. If positive, the acceleration of that wheel is compared to the threshold value A at step 168. If the acceleration is greater than A, a PRPOS flag is set at step 170. Also at this step, a PRNEG flag is reset. Returning to step 166, if the jerk of the right front wheel 12 is negative, the deceleration of that wheel is compared to the threshold value D at step 172. If the deceleration is greater than D, the PRNEG flag is set and the PRPOS flag is reset at step 174. If step 168 or step 172 determines that the acceleration or deceleration of the wheel does not exceed the respective threshold values A or D indicating the undesirable side to side spin cycling condition does not exist, the flags controlled by the spin transfer routine are cleared at step 164 after which the spin transfer routine is exited.

If either of the PRNEG or PRPOS flags was set via step 170 or 174 indicating a potential for the undesirable side to side spin cycling condition, the routine continues to determine if the remaining conditions indicating the spin cycling condition exist. The routine determines at steps 176 and 178 if the jerk of the left front driven wheel 10 is positive and the acceleration of that wheel is greater than the threshold A. If both conditions are met, the state of the PRNEG flag is sampled at step 180. If this flag is set indicating the other driven wheel 12 is behaving in an opposite sense (negative jerk and deceleration greater than D) the out of phase condition is indicated. Otherwise, if the acceleration of the wheel 10 is less than A or if the PRNEG flag is reset, the flags controlled by the spin transfer routine are all cleared at step 164. Similarly, the routine determines at steps 176 and 182 if the jerk of the left front driven wheel 10 is negative and the deceleration of that wheel is greater than the threshold D. If both conditions are met, the state of the PRPOS flag is sampled at step 182. If this flag is set indicating the other driven wheel 12 is behaving in an opposite sense (positive jerk and acceleration greater than A) the out of phase condition is indicated. Otherwise, if the deceleration of the wheel 10 is less than D or if the PRPOS flag is reset, the flags controlled by the spin transfer routine (PREVIOUS, PRPOS, and PRNEG) are all cleared at step 164.

Assuming that an out of phase condition is sensed, the routine proceeds from either the step 180 or 184 to increase the brake pressure of the driven wheel 10 or 12 having the lesser of the two driven wheel brake pressures to a larger percentage of the driven wheel having a larger brake pressure. Step 186 first determines which brake pressure is the lowest by comparing the current command to the actuator 24 controlling the brake pressure to the left front wheel brake 18 to the current command to the actuator 26 controlling the brake pressure to the right front wheel brake 20. If the left wheel actuator 24 current command is lowest, it is reset at step 188 to a higher percentage of the current command to the right wheel actuator 26 by resetting the integral term portion of the current command to the left wheel actuator 24 otherwise determined at step 152 equal to (or, in another embodiment, at a predetermined percentage of) the integral term portion of the current command to the right wheel actuator 26. If the right wheel actuator 26 current command is lowest, it is reset at step 190 to a higher percentage of the current command to the left wheel actuator 24 by resetting the integral term portion of the current command to the right wheel actuator 26 otherwise determined at step 152 equal to (or, in another embodiment, at a predetermined percentage of) the integral term portion of the current command to the left wheel actuator 24. The step 188 or 190 may further reset the corresponding right front or left front driven wheel current command otherwise determined at step 154 of FIG. 6 equal to the current command of the other driven wheel. During subsequent executions of the brake control routine of FIG. 6, the motor current commands will be adjusted in the same manner as previously described.

By this resetting the brake pressure of the driven wheel having the lowest braking pressure to a higher value, there is less of a variance in the torque at the driven wheels resulting in the elimination of the undesirable side to side spin cycling condition.

Following step 188 or 190, the PREVIOUS flag is set at step 192. Thereafter when the spin transfer routine is next executed the program proceeds from step 160 to step 194 where the TCA flags are sampled. If either TCA flag is set indicating that at least one of the driven wheels is still being braked to control acceleration spin, the routine is exited. If step 194 senses that both TCA flags are reset indicating that neither wheel is being braked to control acceleration spin, the flags controlled by the spin transfer routine are cleared at step 164 whereby the spin transfer routine is again conditioned to sense and control side to side spin cycling.

The foregoing description of a preferred embodiment of the invention for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A method of limiting the spin of left and right driven wheels of a vehicle having an engine applying a driving torque to the driven wheels through a differential, the vehicle having right and left brakes for braking the right and left driven wheels, the method comprising the steps of:
   determining an excessive spin condition of each of the left and right driven wheels;
   controlling the right brake to apply a braking force to the right driven wheel in response to a determined excessive spin condition of the right driven wheel, the applied braking force to the right driven wheel having a value determined to establish a predetermined spin condition of the right wheel;
   controlling the left brake to apply a braking force to the left driven wheel in response to a determined excessive spin condition of the left driven wheel, the applied braking force to the left driven wheel having a value determined to establish a predetermined spin condition of the left wheel;
   sensing a side to side spin cycling condition of the right and left wheels while the right and left brakes are both being controlled;
   increasing the lesser one of the braking forces applied to the right and left driven wheels when a side to side spin cycling condition is sensed.

2. The method of claim 1 further including the steps of:
   sensing the speeds of the right and left wheels;
   determining the acceleration and deceleration of the right and left wheels;
   determining the jerk of the right and left wheels; and
   wherein the side to side spin cycling condition is sensed when (A) the jerk of one of the right and left wheels is positive and its acceleration exceeds a predetermined threshold A and (B) the jerk of the other one of the right and left wheels is negative and its deceleration exceeds a predetermined threshold.

3. The method of claim 1 wherein the lesser one of the braking forces applied to the right and left driven wheels is increased to a predetermined percentage of the greater one of the braking forces applied to the right and left driven wheels.

4. A method of limiting the spin of left and right driven wheels of a vehicle having an engine applying a driving torque to the driven wheels through a differential, the vehicle having right and left brakes for braking the right and left driven wheels, the method comprising the steps of:
   sensing left and right wheel spin;
   determining a right brake pressure command including a term that is the integral of the amount the right wheel spin exceeds a predetermined right wheel spin limit;
   determining a left brake pressure command including a term that is the integral of the amount the left wheel spin exceeds a predetermined left wheel spin limit;
   controlling the right and left wheel brakes in accord with the right and left brake pressure commands, respectively;
   sensing a side to side spin cycling condition of the right and left wheels; and
   increasing the lesser one of the integral terms of the right and left brake pressure commands in response to a sensed side to side spin cycling condition.

5. The method of claim 4 wherein the lesser one of the integral terms of the right and left brake pressure commands is increased to a predetermined percentage of the greater one of the integral terms.

6. The method of claim 4 wherein the lesser one of the integral terms of the right and left brake pressure commands is increased to the integral term of the greater one of the integral terms.

7. The method of claim 4 further including the steps of:
   sensing the speeds of the right and left wheels;
   determining the acceleration and deceleration of the right and left wheels;
   determining the jerk of the right and left wheels; and
   wherein the side to side spin cycling condition is sensed when (A) the jerk of one of the right and left wheels is positive and its acceleration exceeds a predetermined threshold A and (B) the jerk of the other one of the right and left wheels is negative and its deceleration exceeds a predetermined threshold.

* * * * *